3,301,903
United States Patent Office
Patented Jan. 31, 1967

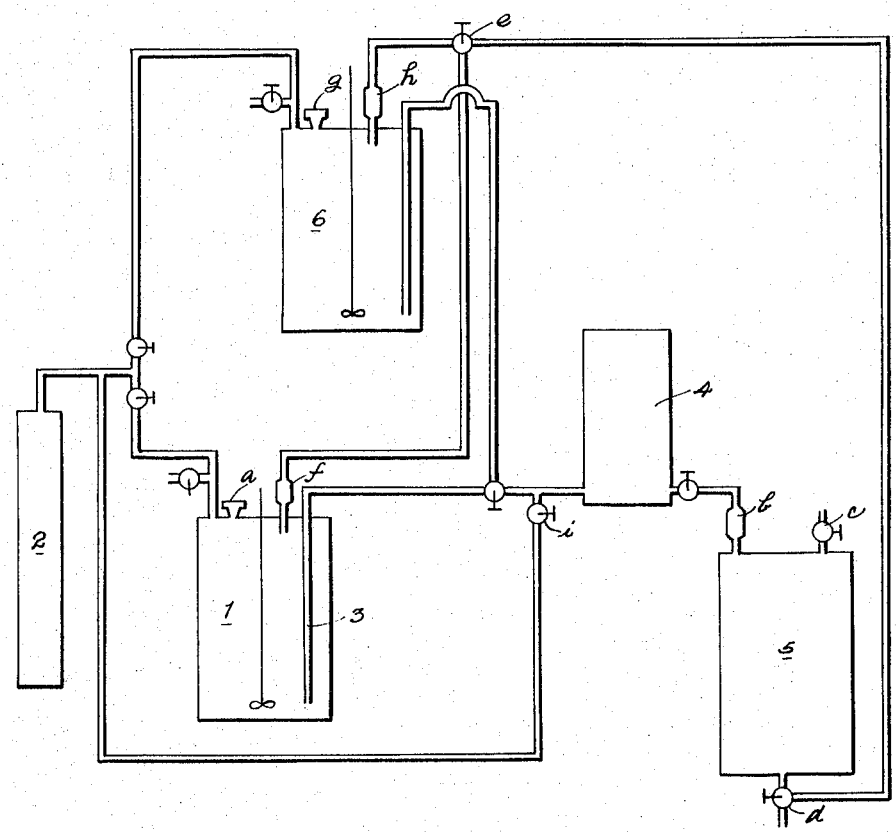

3,301,903
PURIFICATION OF META NITRO PARA TOLUIDINE
John Cryer, New Lenox, and Paul R. Bobo, Jr., Chicago Heights, Ill., assignors to The Sherwin-Williams Company, Cleveland, Ohio, a corporation of Ohio
Filed Oct. 11, 1963, Ser. No. 315,645
5 Claims. (Cl. 260—582)

This invention relates to an improvement in a process for the manufacture of meta nitro para toluidine by ammonolysis of meta nitro para cresol, and particularly to a novel method for purifying the crude meta nitro para toluidine produced by ammonolysis of meta nitro para cresol.

It is well known that meta nitro para toluidine (MNPT) can be produced by ammonolysis of meta nitro para cresol (MNPC). Specifically Cryer, U.S. 2,894,988 and Cryer and Burk, U.S. 2,970,171 disclose processes for production of MNPT comprising subjecting one molar proportion of MNPC, at least about one mole of ammonium chloride (more than merely a catalytic amount) and at least 6 moles of ammonia in an aqueous environment wherein the molar ratio of ammonia to water is at least of greater numerical value than 1:2, in an autoclave passivated against metal ion donation under the conditions of the processing, to the autogenous pressures which develop in the autoclave at temperatures above 125° C., but usually not exceeding 150° C. and preferably less than 145° C. for from about 6 to 40 hours, or a time sufficient to complete substantially the ammonolysis of said MNPC. Such treatment, however, yields only a crude MNPT, the product being contaminated with unreacted starting material (usually 1.5% to 4.0% by weight MNPC) and degradation products. The purification processes taught by the prior art involve recrystallization from toluene. The toluene recrystallization method of purification is unsatisfactory for a number of reasons. Such process is slow, cumbersome, hazardous, and involves numerous manipulative steps, many of which must be carried out by hand. In addition, the toluene recrystallization is a costly method of purifying the crude MNPT.

It is, therefore, an object of the present invention to provide a simple, quick and efficient process for the purification of crude MNPT.

It is another object of the present invention to provide a process for the purification of MNPT wherein unreacted starting material is recoverable.

Another object is to provide an improved process for purifying MNPT which is less costly than methods heretofore known.

A further object is to provide a process for the purification of MNPT which yields a finished product of a higher quality than that produced by methods heretofore known.

These and other objects and advantages of the present invention will be apparent from a reading of the following description.

In brief, the present invention involves contacting anhydrous crude MNPT melt with a particulate solid adsorbent for a time sufficient to allow substantial contact between said melt and said adsorbent at a temperature in excess of the melting point of said MNPT but below the temperature at which substantial decomposition occurs. The adsorbent is then separated from the molten MNPT by suitable means such as filtration, and the filtrate consisting essentially of molten MNPT is recovered. In a preferred embodiment the above melt-adsorption treatment is repeated at least twice. Upon cooling below the melting point of MNPT (118° C.) the solid form of the product is produced.

Specifically in the process, dry liquid MNPT is contacted with a particulate solid adsorbent at a temperature greater than the melting point of MNPT, but below the temperature at which substantial decomposition of MNPT occurs, preferably at a temperature of from about 120° C. to about 130° C. for a time sufficient to obtain good contact between the MNPT melt and the particulate solid adsorbent. Preferably, the MNPT melt and the adsorbent are contacted for about 15 to 45 minutes. After the MNPT melt has contacted the adsorbent, the purified MNPT is recovered by filtration or other suitable means. It is preferred that the above steps again be repeated at least twice.

Filtration of the MNPT melt can be facilitated by gas under pressure, or by heated pump means. Pressures of 15–30 p.s.i are usually sufficient. In addition, the rate of filtration can be improved if the filter is precoated with filter aids such as, for example, diatomaceous silica and asbestos. Examples of suitable filter aids are given in Industrial & Engineering Chemistry, vol. 34, page 405, April 1942.

Substantially any particulate solid adsorbent can be used which is effective in nonaqueous liquids, the amount necessary to effect purification being dependent upon the adsorption characteristics of the substance chosen. It is usually preferable to use 5% to 15% by weight of adsorbent, based on the weight of MNPT. It is preferred that the commercially available adsorbent "Tonsil IFF" be utilized. Where "Tonsil IFF" is used, the preferred amount to be used is about 10 parts by weight of adsorbent for each 100 parts by weight of crude MNPT. "Tonsil IFF" is finely divided siliceous adsorbent having a bulk density of 420 grams per liter loose, or 630 grams per liter packed. The particle size is such that 0.5% is retained on 100 mesh screen (Standard Sieve Series), 7.0% is retained on 150 mesh screen, 17–20% is retained on 250 mesh screen and 80–83% pass a 250 mesh screen.

Another suitable adsorbent is Super Filtrol Grade 1 Adsorbent, a highly activated clay having a particle size such that 100° will pass through a 100 mesh screen, 85% will pass a 200 mesh screen and 70% will pass a 325 mesh screen, an apparent bulk density of 45 lb./cu. ft., a particle density of 1.3, a specific gravity of 2.65 after heating to 1000° F., free moisture 15.0%, free and combined moisture 21.0%, and surface area 275 square meters per gram. The chemical constituents are 70% $SiO_2$, 17.0% $Al_2O_3$, 3.9% $Fe_2O_3$, 3.2% MgO, 1.6% CaO, 1.8% $SO_3$, 1.0% $K_2O$ plus $Na_2O$ and 0.6% $TiO_2$.

Another suitable adsorbent is Celkate T–21, a calcium silicate having a density of 13.5 lb./cu. ft. and of a particle size such that 2.0% is held on a 325 mesh screen.

Where the MNPT melt is separated from the particulate solid adsorbent by filtration, a significant amount of pure MNPT remains occluded within the adsorbent filter press-cake. Some of this occluded MNPT can be recovered by first blowing out the filter and press-cake with pressurized gas, and then steam stripping the remaining press-cake. Steam stripping of the press-cake produces, as a condensate, a mixture of water and purified MNPT. Thus, the two step procedure of gas-blowing and then steam stripping recovers a substantial portion of the MNPT occluded in the filter and press-cake. Furthermore, the quality of the MNPT recovered from the adsorbent press-cake is sufficiently high so that it can be combined with the next crude feed.

The purified MNPT melt obtained after separation from the particulate solid adsorbent can be converted to solid form by cooling the liquid and permitting it to solidify. After solidification, the MNPT can be flaked and ground. Another preferred method of obtaining the MNPT in workable solid form involves spray chilling the purified liquid MNPT.

The following example, in which the quantities are given in parts by weight unless otherwise indicated, taken along with the attached flow diagram, is illustrative of the present invention. The example is not exhaustive, and only purports to exhibit the best method contemplated in the practice of the instant process.

*Example*

In the initial step of the process the filter was precoated with filter aids. As is illustrated in the drawing, vessel 1 is a precoating tank into which is charged 800 g. of pure MNPT (CP 1212 quality) and 10 g. Fibra-flo 4C plus 10 g. Celite 545 through feed opening a. The temperature was raised to 130° C. and, with rapid agitation, 15 p.s.i. nitrogen pressure was applied from tank 2. The slurry was forced out through dip leg 3 and through filter 4. The filtered pure MNPT was collected in receiver 5. Sight-glass b was used to determine when the filtration was complete, whereupon vent-valve c was closed and three-way valves d and e were set so that the filtered pure MNPT was returned to vessel 1. Sight-glass f was used to determine the completion of this operation. Another 10 g. Fibra-flo 4C plus 10 g. Celite 545 was added through feed opening a and the precoating operation was repeated. When this was finished, the filter had been precoated with 40 g. of a 50/50 mixture of Fibra-flo 4C and Celite 545 while the pure MNPT was back in vessel 1.

The filter consisted of a Poro-carbon cartridge (manufactured by R. P. Adams Company, Buffalo, New York) 1¾″ in diameter and 4″ high. The filter had a surface area of 24.4 sq. in. At a pressure drop of 15 p.s.i. across the filter the filtration rate was 2,000 g. per 5 minutes.

Two thousand (2,000) g. of crude MNPT, 100 g. Celite 545, and 200 g. Celkate P21 (a particulate solid adsorbent) were passed through feed opening g into crude feed tank 6. When the temperature reached 130° C., 15 p.s.i. nitrogen pressure was applied with rapid agitation and the slurry was filtered in the manner described above. Sight-glass b was used to determine the completion of the filtration. The filtrate collected in receiver 5 was either run out through valve d or was returned to crude feed tank 1 through sight-glass h. The filter cake was partially stripped of MNPT by blowing with nitrogen through by-pass valve i. When the cake filled the filter, it was completely stripped by flowing with 130° C. steam. The distilled MNPT was collected in receiver 5 and returned to vessel 6 for purification while the filter cake was removed.

The first filtration of the crude gave a product (Filtrate A) containing zero "residue." A polishing filtration (carried out in precisely the same manner as the first filtration except that no precoat and no filter aid was needed) was then made in which Tonsil IFF (a particulate solid adsorbent) was added in an amount equal to 5% of the weight of Filtrate A charged. This operation produced Filtrate B. A final polishing filtration was made in the same manner as the first polishing filtration except that Superfiltrol Grade 1 was added in an amount equal to 5% of the weight of Filtrate B charged. This operation produced Filtrate C. To molten Filtrate C was added 0.03% of its weight of Triton X–100. This final melt-solution can either be flaked, grained, spray-chilled or treated in whatever fashion is found to be most economical to produce a 325 mesh powder.

The use of nitrogen for pressuring the melt through the filtration system is an inexpensive way of avoiding the cost of purchasing and installing steam-jacketed pumps. The entire filtration system was electrically heated to a temperature of 125 to 130° C. in the equipment set out in the flow chart. In a plant installation the equipment likely would be steam-jacketed which would eliminate the need for electric heating equipment.

In the test described above, the residue content of the crude varied between 1 and 3%. Such a crude can be treated very satisfactorily by the subject process, although it is of benefit to have the residue content of the crude at a minimum.

It will be recognized that changes and variations may be made without departing from the invention. It should be noted that the particle size distribution of filter aids is substantially different from the particle size distribution of the particulate adsorbents. In general, the filter aids have larger particle sizes than the adsorbents. For example, six filter aids described in Table II in Industrial & Engineering Chemistry, vol. 44, page 405, April 1942, have the following particle size distribution:

| Mesh Size | Filter-Cel | Standard Super-Cel | Hyflo Super-Cel | Celite 503 | Celite 535 | Celite 545 |
|---|---|---|---|---|---|---|
| 40 | 2.5 | 4.5 | 6.0 | 12.0 | 17.5 | 24.0 |
| 40–20 | 8.0 | 10.0 | 15.5 | 25.5 | 32.0 | 52.0 |
| 20–10 | 14.0 | 20.0 | 33.5 | 29.0 | 32.0 | 18.5 |
| 10–6 | 19.0 | 24.5 | 22.0 | 19.5 | 16.0 | 4.5 |
| 6–2 | 37.5 | 33.5 | 21.5 | 13.5 | 2.5 | 1.0 |
| 2 | 19.0 | 7.5 | 1.5 | 0.5 | | |

On the other hand, the particulate adsorbents employed in the practice of the invention normally have a major percentage of the particles passing through a 250 mesh screen. In most cases at least 80% of the particles of the particulate adsorbent will pass through a 250 mesh screen. It is therefore desirable in using finely divided adsorbents to add a minor proportion of a filter aid, preferably about 2% by weight, in order to maintain the filtration rate. Otherwise, the adsorbents will tend to plug the filters. In most cases, plugging is prevented by coating the filter aids on the filter cartridge.

As was indicated above, it is preferred to contact the anhydrous MNPT melt at least three times with a particulate solid adsorbent. Each time the adsorbent is separated from the molten MNPT by suitable means such as filtration. In a most preferred embodiment the MNPT melt will be contacted with the particulate solid adsorbent and then separated from the adsorbent by filtration from three to five times.

Obviously many modifications and variations of the invention as hereinbefore set forth may be made without departing from the spirit and scope thereof, and therefore only such limitations should be imposed as are indicated in the appended claims.

The invention is hereby claimed as follows:

1. The process for purifying meta nitro para toluidine obtained by the ammonolysis of meta nitro para cresol comprising contacting an anhydrous crude meta nitro para toluidine melt with a particulate solid adsorbent having a particle size such that a major percentage of the particles will pass a 250 mesh screen for a time sufficient to permit adsorption of impurities from said meta nitro para toluidine by said adsorbent, at a temperature in excess of the melting point of said meta nitro para toluidine but below the temperature at which substantial decomposition occurs, and thereafter separating said meta nitro para toluidine from said particulate solid adsorbent.

2. The process for purifying meta nitro para toluidine obtained by the ammonolysis of meta nitro para cresol comprising contacting an anhydrous crude meta nitro para toluidine melt with a particulate solid adsorbent having a particle size such that a major percentage of the particles will pass a 250 mesh screen for a time sufficient to allow substantial contact between said melt and said adsorbent, at a temperature in excess of the melting point of said meta nitro para toluidine but below the temperature at which substantial decomposition occurs, separating said meta nitro para toluidine from said particulate solid adsorbent and thereafter repeating said steps of contacting the MNPT resultant melt with a particulate solid adsorbent and separating said MNPT from said particulate solid adsorbent at least two additional times.

3. The process for purifying meta nitro para toluidine obtained by the ammonolysis of meta nitro para cresol comprising contacting an anhydrous crude meta nitro part toluidine melt with a particulate solid adsorbent having a particle size such that a major percentage of the particles will pass a 250 mesh screen for from about 15 to about 45 minutes, at a temperature in excess of the melting point of said meta nitro para toluidine but below the temperature at which substantial decomposition occurs, and thereafter separating said meta nitro para toluidine from said particulate solid adsorbent.

4. The process for purifying meta nitro para toluidine obtained by the ammonolysis of meta nitro para cresol comprising contacting an anhydrous crude meta nitro para toluidine melt with from about 5 to 15% by weight of a particulate solid adsorbent based on the weight of said anhydrous crude MNPT melt for from about 15 to about 45 minutes, at a temperature in excess of the melting point of said meta nitro para toluidine but below the temperature at which substantial decomposition occurs, and thereafter separating said meta nitro para toluidine from said particulate solid adsorbent, said adsorbent having a particle size such that a major percentage of the particles will pass a 250 mesh screen.

5. The process for purifying meta nitro para toluidine obtained by the ammonolysis of meta nitro para cresol comprising contacting an anhydrous crude meta nitro para toluidine melt with from about 5 to 15% by weight of a particulate solid adsorbent based on the weight of said anhydrous crude MNPT melt for from about 15 to about 45 minutes, at a temperature of from about 120 to about 130° C., and thereafter separating said meta nitro para toluidine from said particulate solid adsorbent, said adsorbent having a particle size such that a major percentage of the particles will pass a 250 mesh screen.

References Cited by the Examiner

UNITED STATES PATENTS

| 2,365,493 | 12/1944 | Richardson | 260—582 |
| 2,623,903 | 12/1952 | Weaver et al. | 260—582 |
| 2,950,319 | 8/1960 | Schenck et al. | 260—582 |
| 3,069,470 | 12/1962 | Fleck et al. | 260—582 |

FOREIGN PATENTS 1,128,430  4/1962  Germany.

CHARLES B. PARKER, *Primary Examiner.*

D. R. MAHANAND, D. M. PAPUGA

*Assistant Examiners.*